United States Patent [19]

Slater et al.

[11] Patent Number: 4,994,248

[45] Date of Patent: Feb. 19, 1991

[54] $P_2O_5$ RECOVERY AND PHOSPHORIC ACID PURIFICATION

[75] Inventors: S. W. Slater, Lake City, Fla.; S. R. Hylkema, Tonawanda, N.Y.; L. J. Klein, Corpus Christi, Tex.

[73] Assignee: Occidental Chemical Corporation, Niagara Falls, N.Y.

[21] Appl. No.: 361,519

[22] Filed: Jun. 5, 1989

[51] Int. Cl.$^5$ .................... C01B 25/16; C02F 1/00
[52] U.S. Cl. .................... 423/320; 423/319; 423/321 R; 210/744
[58] Field of Search .................... 423/164, 167, 321 R, 423/320, 319; 210/104, 137, 744

[56] References Cited

U.S. PATENT DOCUMENTS

| | | | |
|---|---|---|---|
| 4,235,854 | 11/1980 | Smith et al. | 423/321 R |
| 4,243,643 | 1/1981 | Mills | 423/321 R X |
| 4,443,421 | 4/1984 | Hollifield et al. | 423/321 |
| 4,592,901 | 6/1986 | Smith et al. | 423/320 |

*Primary Examiner*—Gregory A. Heller

*Attorney, Agent, or Firm*—James F. Tao; Richard D. Fuerle

[57] ABSTRACT

Disclosed is an improved process for purifying phosphoric acid where a calcium sulfate hemihydrate slurry is first filtered to produce a first filtrate and a filter cake which comprises calcium sulfate hemihydrate, the calcium sulfate hemihydrate filter cake is slurried to produce a slurry containing less than 2% by weight free sulfate ion, which is hydrated in a hydration tank to produce a calcium sulfate dihydrate slurry, and the calcium sulfate dihydrate slurry is filtered on a second filter to produce a second filtrate and a gypsum filter cake. The improvement comprises recycling the second filtrate to the second filter in an amount (1) sufficient to reduce the flow rate of the calcium dihydrate slurry from the hydration tank to the second filter so that the residence time of the slurry in the hydration tank is at least two hours and (2) at least sufficient to maintain liquid on the second filter. Also disclosed is an apparatus for performing this process.

16 Claims, 1 Drawing Sheet

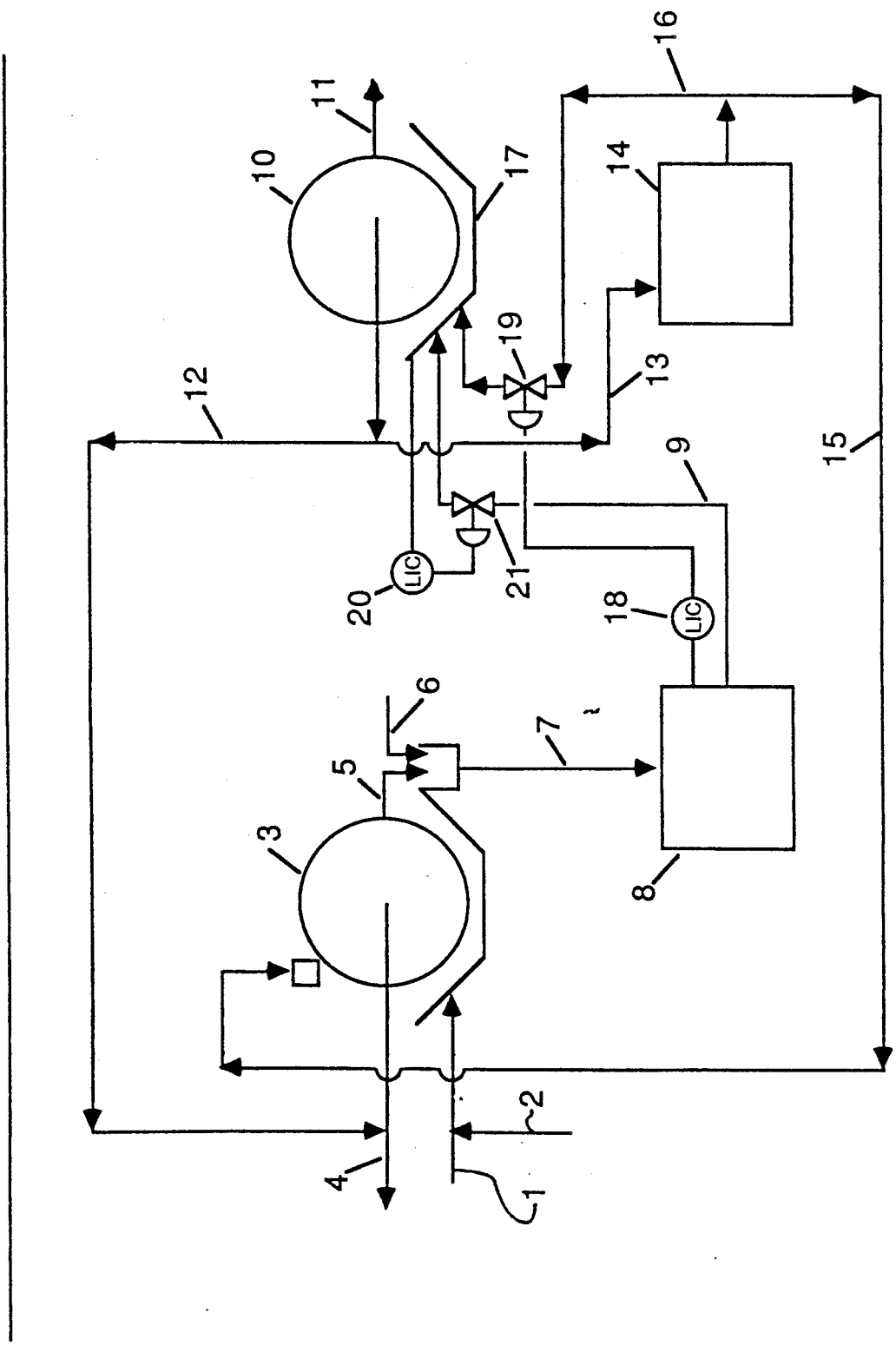

4,994,248

P₂O₅ RECOVERY AND PHOSPHORIC ACID PURIFICATION

BACKGROUND OF THE INVENTION

This invention relates to an improved secondary purification process for phosphoric acid. Specifically, it relates to such a process where a portion of the filtrate from the calcium sulfate dihydrate filter is recycled to the same filter.

Superphosphoric acid (SPA), which is used in the manufacture of fertilizers, is phosphoric acid containing about 68 to about 70% by weight of $P_2O_5$. It can be manufactured by dissolving calcium phosphate rock with sulfuric acid, producing a slurry of calcium sulfate hemihydrate in a solution of phosphoric acid. The slurry is filtered and the calcium sulfate hemihydrate filter cake is discarded. The filtered acid is evaporated to about 48% $P_2O_5$ for further purification.

Some phosphate rock used in this process contains a significant quantity of magnesium, which is dissolved by the sulfuric acid. If the magnesium is left in solution with the phosphoric acid, magnesium pyrophosphate forms when the solution is evaporated to SPA. When the SPA is ammoniated, an ammonium magnesium pyrophosphate sludge forms which creates a serious pluggage problem for liquid fertilizer manufacturers.

In order to avoid this problem, the magnesium is removed from the phosphoric acid. This can be accomplished by the addition of synspar, essentially a calcium fluoride compound made as described in U.S. Pat. Nos. 4,171,342 and 4,243,643, herein incorporated by reference. The addition of the synspar to the phosphoric acid slurry results in the precipitation of Ralstonite, $MgAlF_5$ (aluminum is normally present in the rock and is dissolved by the sulfuric acid), and hemihydrate gypsum.

To remove the Ralstonite and hemihydrate gypsum, the slurry is filtered on a rotary drum vacuum filter. The hemihydrate cake containing Ralstonite is discharged to a hydration tank, and is reslurried with pond water. The hemihydrate gypsum dissolves and reforms as dihydrate gypsum in this tank. The slurry is then filtered on a second rotary drum vacuum filter. The filtrate is mixed with the filtrate from the first drum filter for further processing. The dihydrate cake containing Ralstonite is disposed of.

In order to maximize the $P_2O_5$ recovery, it was, until now, necessary to maintain a minimum of 2% free sulfate ion in the hydration tank. As long as the free sulfate ion concentration in the hydration tank was maintained at least 2%, recrystallization of the calcium sulfate hemihydrate as calcium sulfate dihydrate occurred even though the residence time of the slurry in the hydration tank often varied considerably. But when the free sulfate ion concentration fell below about 2% more time was required to convert the hemihydrate crystals to dihydrate crystals, and frequently the residence time in the hydration tank was not long enough for a complete conversion to occur. When that happened calcium sulfate hemihydrate entered the calcium sulfate dihydrate filter and formed calcium sulfate dihydrate on the filter, plugging the filter.

In order to maintain a free sulfate ion concentration of at least 2% in the hydration tank, it was necessary to add sulfate ion (as sulfuric acid) in excess of the amount required to precipitate the dissolved calcium as calcium sulfate. However, if calcium phosphate rock having a high concentration of magnesium was used in the process, it was necessary to add extra synspar to remove the extra magnesium, and, since the calcium in the synspar removes sulfate ion as calcium sulfate, the free sulfate ion concentration would sometimes fall to less than 2%, or even less than 1%. When the free sulfate ion concentration was less than 2%, the residence time of the calcium sulfate hemihydrate slurry in the hydration tank was frequently not long enough to convert all of the calcium sulfate hemihydrate to calcium sulfate dihydrate. The unconverted calcium sulfate hemihydrate would then enter the calcium sulfate dihydrate filter where it would form the calcium sulfate dihydrate and clog the filter. If the residence time in the hydration tank was increased by shutting off the flow of the slurry from the hydration tank to the calcium sulfate dihydrate filter, the calcium sulfate dihydrate filter would become "dry" and would have to be shut down and restarted again when the required residence time had passed and slurry was again available for filtering. This resulted in $P_2O_5$ losses in the lines and equipment, known as "tramp" losses. There did not appear to be any way of solving this problem without reducing the efficiency of the process and lowering the recovery of $P_2O_5$.

SUMMARY OF THE INVENTION

We have discovered that the above-described process can be run efficiently with a very high recovery of $P_2O_5$, even when the free sulfate ion level is less than 2%, or even less than 1%, if the filtrate from the calcium sulfate dihydrate filter is recycled back to the calcium sulfate dihydrate filter. On first impression, it would not seem to make any sense to filter a liquid and then return the filtered liquid again to the same filter, but, by doing this the slurry drawn from the hydration tank can be reduced so that the residence time of the slurry in the hydration tank is increased to at least two hours. In addition, the calcium sulfate dihydrate filter is kept wet and the "tramp" losses of $P_2O_5$, which result when that filter is shut down, are avoided.

We have further discovered that the efficiency of the process in recovering $P_2O_5$ can still be maximized, even when the concentration of free sulfate ion in the slurry is less than 2%, or even less than 1%. Indeed, we have found that the amount of sulfuric acid used to dissolve the phosphate rock can be substantially stoichiometric, and that it is not necessary to add sulfate ion in excess of the amount required to precipitate the dissolved calcium. As a result, less sulfuric acid is used and, because the sulfate ion is an impurity which displaces $P_2O_5$ in the superphosphate product, the $P_2O_5$ concentration in the superphosphate product is higher and the product is more valuable.

DESCRIPTION OF THE INVENTION AND DRAWING

The accompanying drawing is a flow diagram which illustrates a certain presently preferred embodiment of an apparatus and process according to this invention.

In the drawing, phosphoric acid feed slurry in line 1 is mixed with synspar in line 2. The resulting mixture typically contains about 48% dissolved $P_2O_5$ and small concentrations of aluminum and magnesium ions, and contains about 6 to about 12% by weight solids, which are primarily a mixture of about 88 to about 92% calcium sulfate hemihydrate and about 8 to about 12% Ralstonite. The slurry is sent to calcium sulfate hemihydrate filter 3 where it is filtered. The filtrate in line 4 becomes the $P_2O_5$ product acid. The filter cake in line 5 is mixed with pond water (typically about 1½ to 2½% by weight $P_2O_5$ with small concentrations of aluminum, iron, fluoride, and sulfate) in line 6 to form a slurry which is sent through line 7 to hydration tank 8. In hydration tank 8 the calcium sulfate hemihydrate in the slurry recrystallizes as calcium sulfate dihydrate. A residence time of at least two hours is normally required to complete this conversion. The calcium sulfate dihydrate slurry then passes through line 9 to calcium sulfate dihydrate filter 10 where it is filtered to produce gypsum filter cake 11. Filter 10 can be a variety of different types of filters, but it is preferably a membrane filter such as that described in U.S. Pat. No. 4,443,421, herein incorporated by reference, because a membrane filter provides better throughput. A portion of the filtrate from calcium sulfate dihydrate filter 10 can be sent through line 12 to line 4 where it becomes part of the product acid, and another portion of the filtrate is sent through line 13 to cake wash feed tank 14 where it is stored. From cake wash feed tank 14, a portion of the filtrate flows through line 15 where it washes the calcium sulfate hemihydrate filter cake on filter 3. Washing the calcium sulfate hemihydrate filter cake removes high concentration $P_2O_5$ from the filter cake and replaces it with lower concentration $P_2O_5$, which increases the recovery of $P_2O_5$ in the product acid, and also increases the recovery of $P_2O_5$ in filter 10, and also improves conversion of hemihydrate gypsum to dihydrate gypsum. A second portion of the filtrate from cake wash feed tank 14 flows through line 16 to trough 17 of filter 10.

Since the residence time in hydration tank 8 is directly proportional to the amount of slurry in the tank, a low fluid level in hydration tank 8 can be used to indicate that the residence time in the tank is too short to permit adequate conversion of the calcium sulfate hemihydrate to calcium sulfate dihydrate. Level indicator control 18 opens valve 19 when the level in hydration tank 8 has fallen to where the residence time of the calcium sulfate hemihydrate slurry in hydration tank 8 is about two hours. When valve 19 opens, the fluid level in trough 17 rises, which causes level indicator control 20 to close valve 21, thereby reducing the flow of slurry from hydration tank 8 through line 9 to filter 10. When the level in hydration tank 8 has risen so that the residence time in the hydration tank exceeds two hours, level indicator control 18 closes valve 19 which reduces the liquid level in trough 17. When the fluid level in trough 17 falls, level indicator control valve 20 opens valve 21, thereby drawing more liquid slurry from hydration tank 8 through line 9 into trough 17. In effect, the filtrate from filter 10 is recycled back to the same filter in an amount sufficient to (1) reduce slurry flow from the hydration tank so that the residence time in the tank is at least two hours, and (2) maintain liquid on filter 10 so that it does not go dry.

The following examples further illustrate this invention.

EXAMPLE 1

The equipment and process used in this Example were substantially as shown in the accompanying drawing. The feed acid slurry contained 48% dissolved $P_2O_5$, about 0.76% magnesium, and about 1.6% free sulfate ion, and was about 10% solids (principally $CaSO_4$). To the feed acid was added 7.3% synspar to precipitate Ralstonite. The process used four calcium sulfate hemihydrate filters which fed into two calcium sulfate dihydrate filters for a 3:1 volume ratio of the two filters. Each calcium sulfate dihydrate filter was 12 feet in diameter and 12 feet long and had a polyester membrane. The flow rate of the calcium sulfate dihydrate filtrate recycled to the calcium sulfate dihydrate filter was 70 gal/min, the flow rate of the filtrate used to wash the calcium sulfate hemihydrate filter cake was 12 gal/min, and the flow rate of the filtrate sent to the product acid was 80 gal/min. A statistical comparison of the cake loss was made using month end averages. The cake losses when the filtrate from the calcium sulfate dihydrate filter was not recycled to that filter were compared to the cake losses which resulted when the filtrate from the calcium sulfate dihydrate filter was recycled to that filter. The following tables give the results:

| Month | P.W. Corrected* Cake Loss | Free $SO_4$ = (%) |
|---|---|---|
| | NO RECYCLE | |
| September | 1.19 | 2.55 |
| October | 1.52 | 2.27 |
| November | 1.86 | 2.27 |
| December | 0.84 | 2.76 |
| Arithmetic Mean | 1.3525 | 2.4625 |
| Standard Deviation | 0.4377 | 0.2382 |
| | WITH RECYCLING | |
| June | 0.98 | 1.64 |
| July | 1.02 | 1.49 |
| Arithmetic Mean | 1.0000 | 1.5650 |
| Standard Deviation | 0.0283 | 0.1061 |

*The pond water (P.W.) contribution to the $P_2O_5$ recovery was taken into account.

The above tables shows that recycling according to the process of this invention resulted in substantially less $P_2O_5$ loss in the filter cake, even when the free sulfate ion concentration was less than 2%.

We claim:

1. In a wet process for making phosphoric acid wherein a slurry of calcium sulfate containing dissolved phosphoric acid and less than 2% by weight free sulfate ion is passed through a tank to a filter, the improvement which comprises monitoring the liquid level in said filter and the residence time of said slurry in said tank and recycling a portion of the filtrate from said filter back to said filter, sufficient to maintain
    (1) a minimum residence time of said slurry in said tank; and
    (2) the liquid level in said filter.

2. A process according to claim 1 wherein said residence time is directly proportional to the fluid level in said tank and the amount of said filtrate that is recycled is controlled by the fluid level in said tank.

3. In a process for purifying phosphoric acid where a first slurry of calcium sulfate hemihydrate and dissolved phosphoric acid is filtered on a first filter to produce a first filtrate and a filter cake which comprises calcium sulfate hemihydrate, a second slurry containing less than 2% by weight free sulfate ion is formed of said calcium sulfate hemihydrate filter cake, said second slurry is hydrate in a hydration tank to produce a calcium sulfate dihydrate slurry, and said calcium sulfate dihydrate slurry is filtered on a second filter to produce a second filtrate and a gypsum filter cake, the improvement which comprises monitoring the liquid level in said second filter and the residence time of said slurry in said hydration tank, and recycling a portion of said second filtrate to said second filter in an amount (1) sufficient to reduce the flow rate of said calcium sulfate dihydrate slurry from said hydration tank to said second filter so that the residence time of said calcium sulfate dihydrate slurry in said hydration tank is at least two hours, and (2) at least sufficient to maintain liquid on said second filter.

4. A process according to claim 3 wherein a portion of said second filtrate is used to wash said calcium sulfate hemihydrate filter cake on said first filter.

5. A process according to claim 3 wherein a portion of said second filtrate is added to said first filtrate.

6. A process according to claim 3 wherein said calcium sulfate hemihydrate filter cake is slurried with pond water.

7. A process according to claim 3 wherein said free sulfate ion concentration is less than 1%.

8. A process according to claim 3 wherein said second filter is a membrane filter.

9. A process according to claim 3 wherein said dissolved phosphoric acid contains magnesium, including the step of adding synspar to said first slurry to precipitate Ralstonite.

10. A process according to claim 9 wherein said calcium sulfate hemihydrate is the reaction product of synspar and a substantially stoichiometric amount of sulfuric acid.

11. A method of purifying phosphoric acid containing magnesium and aluminum comprising:
   (a) adding calcium fluoride to a first aqueous slurry of said phosphoric acid to precipitate Ralstonite;
   (b) filtering said first slurry on a first filter to form a first filtrate and a first filter cake;
   (c) forming a second aqueous slurry containing less than 2% by weight free sulfate ion from said first filter cake;
   (d) passing said second slurry to a hydration tank, where said calcium sulfate hemihydrate recrystallizes as calcium sulfate dihydrate;
   (e) monitoring the residence time of said second slurry in said hydration tank;
   (f) controlling the flow of said second slurry from said hydration tank to a second filter so that the residence time of said second slurry in said hydration tank is at least two hours;
   (g) filtering said second slurry on said second filter to form a second filtrate and a second filter cake;
   (h) monitoring the liquid level in said second filter; and
   (i) recycling an amount of said second filtrate to said second filter sufficient to
      (1) maintain liquid on said second filter, and
      (2) maintain said residence time of said slurry in said hydration tank of at least 2 hours.

12. A method according to claim 11 including the step of washing said first filter cake with a portion of said second filtrate.

13. A method according to claim 11 wherein a first indicator increases or decreases the recycling of said second filtrate to said second filter when the residence time in said hydration tank decreases or increases, respectively, and a second indicator reduces or increases the flow of said second slurry from said hydration tank to said second filter when the amount of said second filtrate recycled to said second filter increases or decreases, respectively.

14. A method according to claim 11 wherein the amount of said second filtrate recycled to said second filter varies inversely with the residence time of said second slurry in said hydration tank, and the flow of said second slurry from said hydration tank to said second filter varies directly with the residence time of said second slurry in said hydration tank.

15. A method according to claim 11 wherein the amount of said second filtrate which is recycled to said second filter is controlled by a first level indicator control which is responsive to the fluid level in said hydration tank, and the flow of said second slurry from said hydration tank to said second filter is controlled by a second level indicator control which is responsive to the fluid level in said second filter.

16. In a wet phosphoric acid process where a slurry of calcium sulfate hemihydrate and dissolved phosphoric acid containing less than 2% by weight free sulfate ion is hydrated to produce a calcium sulfate dihydrate slurry which is then filtered through a filter, the improvement which comprises monitoring the liquid level in said filter and recycling a portion of the filtrate from said filter back to said filter when necessary to maintain said liquid level.

* * * * *